(12) United States Patent
Kowal et al.

(10) Patent No.: US 6,244,114 B1
(45) Date of Patent: *Jun. 12, 2001

(54) AIRFLOW MEASUREMENT DEVICE

(76) Inventors: Jan Casimir Kowal, 68 Milton Park, Abingdon, Oxon OX14 4 RX; Andre N. Blond, Beechlands, Penfold Lane, Holmer Green, Bucks HP15 6XW, both of (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,681

(22) Filed: Sep. 30, 1998

(51) Int. Cl.[7] ....................................................... G01F 1/66
(52) U.S. Cl. ..................................... 73/861.26; 73/861.27
(58) Field of Search ........................... 73/861.18, 861.25, 73/861.26, 861.27, 861.28, 861.29, 861.31, 861, 170.13, 170.11

(56) References Cited

U.S. PATENT DOCUMENTS

| | | | | |
|---|---|---|---|---|
| 4,164,865 | * | 8/1979 | Hall et al. | 73/861.28 |
| 4,351,192 | * | 9/1982 | Toda et al. | 73/861.18 |
| 4,615,214 | * | 10/1986 | Burns | 73/170.15 |
| 4,890,488 | * | 1/1990 | Pincent et al. | 73/861.27 |
| 5,282,388 | * | 2/1994 | Czajkowski | 73/861.28 |
| 5,343,744 | * | 9/1994 | Ammann | 73/861.28 |

* cited by examiner

*Primary Examiner*—Benjamin R. Fuller
*Assistant Examiner*—Jagdish Patel (57) ABSTRACT

A hand-held air flow measuring device comprises a plurality of transducer members mounted on a housing, each transducer member having a piezoelectric membrane which transmits and receives ultrasonic signals. The device causes at least two ultrasonic signal paths between the transducers wherein the signals are angularly inclined relative to each other. A timing arrangement is also provided for use with the flow measuring device for measuring and digitally displaying the measurement values.

2 Claims, 7 Drawing Sheets

AIRFLOW MEASUREMENT DEVICE

FIELD OF THE INVENTION

This invention is related generally to an airflow measuring device and more particular to an airflow meter for measuring air velocity, air volume flow and airstream temperature. In one particular aspect, this invention relates to an airflow meter which is used with a timing arrangement which offers high accuracy without a having computational overhead. In a more specific aspect, the present invention is directed to a portable, hand-held airflow measuring meter for measuring the velocity, volume flow and temperature of an airstream.

BACKGROUND OF THE INVENTION

It is well known that ultrasonic signals may be used as a means of measuring wind speed and direction. Indeed, ultrasonic air flow meters have a number of advantages over mechanical air flow meters. Many of these advantages are a consequence of the fact that an ultrasonic air flow meter has no moving parts. The absence of moving parts reduces the number of components requiring maintenance and repair, thus increasing the life of ultrasonic air flow meters whilst decreasing their operating costs.

An example of a prior art arrangement which utilizes ultrasonic signals for the purpose of measuring wind speed and direction is illustrated in U.S. Pat. No. 5,343,744. The embodiments described in U.S. Pat. No. 5,343,744 employ three or more ultrasonic signal paths and three or more electroacoustic transducers. Each transducer has a directional response characterized by a primary lobe disposed on a primary axis, and a secondary lobe centered on the primary axis but inclined at a lobe angle. The second lobe surrounds the primary lobe in a conical configuration which diverges with distance from the transducer. Each transducer both transmits and receives firstly a continuous wave acoustic signal and then an acoustic pulse signal. The propagation time of a continuous wave signal may be measured with a high degree of accuracy, whilst the propagation time of a pulse signal may be measured rather less accurately, but over a greater air flow speed range. Thus, the embodiments described in U.S. Pat. No. 5,343,744 employ continuous wave signals and pulse signals to provide an air flow meter capable of accurately measuring air flow speed over a large range.

However, the use of both continues wave signals and pulse signals, each transmitted along three or more signal paths, requires the use of complex and costly processing circuitry. Furthermore, the high divergence of the transmitted signals is inefficient.

Providing an accurate measurement of gas flow velocities may also be difficult in practice. For example, in a single time of flight (ToF) arrangement in which the transducers are 30 mm apart, to provide an accuracy of 5 mm per second the ToF measurement needs to be accurate to within 2.5 nanoseconds. This would require a 400 megahertz clock and a signal with a phenomenal signal-to-noise ratio. Such an arrangement is just not practicable for reasons of cost and the amount of noise in any real environment.

Several air movement measuring devices have been described in the prior art U.S. Pat. No. 4,031,756 describes an ultrasonic air measuring device which is suitable for use with an aircraft.

U.S. Pat. No. 5,357,810 describes another ultrasonic transducer for air flow measurement.

The airflow measurement devices described in the aforementioned patents are costly, cumbersome to construct and operate and are not amenable to be hand-held during their use.

It is therefore an object of this invention to provide an airflow measurement device which is accurate and simple to use.

It is also an object of the present invention to provide an airflow measurement device which can be conveniently held by hand during measurement.

It is also an object of the present invention to provide an air flow meter capable of measuring the speed of an air flow by measuring the propagation time of pulse signals transmitted along two signal paths.

It is a further object of the present invention to provide an air flow meter employing transducers generating ultrasonic signals with low divergence in the vertical direction.

BRIEF DESCRIPTION OF THE DRAWINGS

In the drawings, wherein like reference numerals are employed to designate like parts.

DETAILED DESCRIPTION OF THE INVENTION

Thus, the present invention provides a timing arrangement for the air flow meter of this invention, comprising a digital timer for measuring an interval between pi of events to provide a plurality of interval values, means for storing a representation of the number of occurrences of each interval value over the plurality of interval values such that the representation of the number of occurrences of a particular interval value is stored in a Random Access Memory (RAM) address immediately adjacent those which store the representations of the number of occurrences of the immediately lower and the immediately higher interval values through said particular interval values, and means responsive to the completion of storage of the plurality of representations for deriving an average value for at least a proportion of the plurality of interval values.

By averaging a large number of ToF measurements improved accuracies are obtained in accordance with statistical averaging theory. Where the large number of measurements produces a distribution of values, the error in the estimate of the "true value" is reduced substantially. In the case of a Gaussian distribution the error is reduced by a factor of the square root of n, where n is the number of measurements made. A variety of averaging techniques are applicable to the present invention and the word "average" is to be understood to mean more than just an arithmetic mean.

The timing arrangement according to the invention is capable of measuring and processing a large number of interval values without a large processing overhead thanks to the arrangement of the data in the RAM. Each of the sampling "bins" is allocated directly to an address in the RAM. Thus, when an interval value is received from a timer or when the contents of a bin are required for statistical processing, the bin can be accessed directly; in other words, in just a single processor step. When the enormous number of memory accesses (to both store and retrieve data) for providing the average of a large number of timing measurements is considered, it will be appreciated that this timing arrangement provides an enormous saving in required processor power.

Taking the example of a gas flow velocity measurement device above, if a 16 megahertz clock is used for averaging 2,400 upstream and 2,400 downstream measurements., a theoretical accuracy of 1.27 ns is obtained. The storage and processing of this number of statistical samples (in other words filling and accessing the contents of the bin) would require a considerable amount of processing power using conventional memory access techniques.

In order to reduce the effects of noise on the accuracy of the signal it has been found particularly effective to derive the average value from a relatively small number of interval values in the region of the most commonly occurring interval value. The average value is derived as the sum of the RAM address multiplied by the number of occurrences in that address for a number of interval values on either side of the most commonly occurring value. Typically, where the distribution of samples is not skewed, the same number of interval values are considered on either side of the most commonly occurring value. The division process normally associated with the derivation of an arithmetic mean may be omitted when the number of samples is constant in order to reduce the computational load.

This provides an indication of the average value that may be compared with previous and subsequent values. Subsequent processing of the averaged interval values will then be adapted to accept such values. An alternative approach to reducing the computational load is to perform the division as infrequently as possible. In the air flow meter of the present invention this is performed once for each updating of a display and not every time that the memory contents are selected and summed.

In order to avoid the time taken to process the data stored in the RAM from suspending timing measurements, the timing arrangement may conveniently be provided with further memory for storing the occurrences of the plurality of interval values during the time that an earlier plurality of interval values is being processed. A further RAM may be provided or another portion of the same RAM may be used with a fixed offset in its addressing so that the other portion of RAM is not over-written. For example, the first plurality of interval values may be stored in RAM addresses between 0 and $(2^n-1)$, and a second plurality of interval values may be stored in RAM addresses between $2^n$ and $(2^n+2^n-1)$. This can be achieved simply by making the address bit of the RAM which corresponds to $2^n$ equal to 1 for the second plurality of occurrences. Where memory overhead is an important consideration, however, it may be preferable to suspend measurements during processing and then recommence measurements using the same portion of RAM after it has been reset to zero or "cleared-down".

In order to ensure that an average interval value is not based upon a statistically unsound series of data, the timing arrangement may further be provided with means for detecting whether the RAM addresses from which the average value is derived contain a large enough number of occurrences. For example, in the example given previously where 4,800 measurements are made overall, such detecting means could provide an indication that the average value is unsound if the RAM addresses contain fewer than 1,000 occurrences in total. The apparatus shown in FIGS. 1 to 4 has three identical transducer assemblies 2a, 2b, 2c arranged equidistant from a longitudinal axis 3 (see FIG. 3(b)). The transducer assemblies 2a, 2b, 2c lie parallel with the longitudinal axis 3 and are equispaced thereabout. The upper ends of the transducer assemblies 2a, 2b, 2c lie coplanar with one another.

Figure 4:
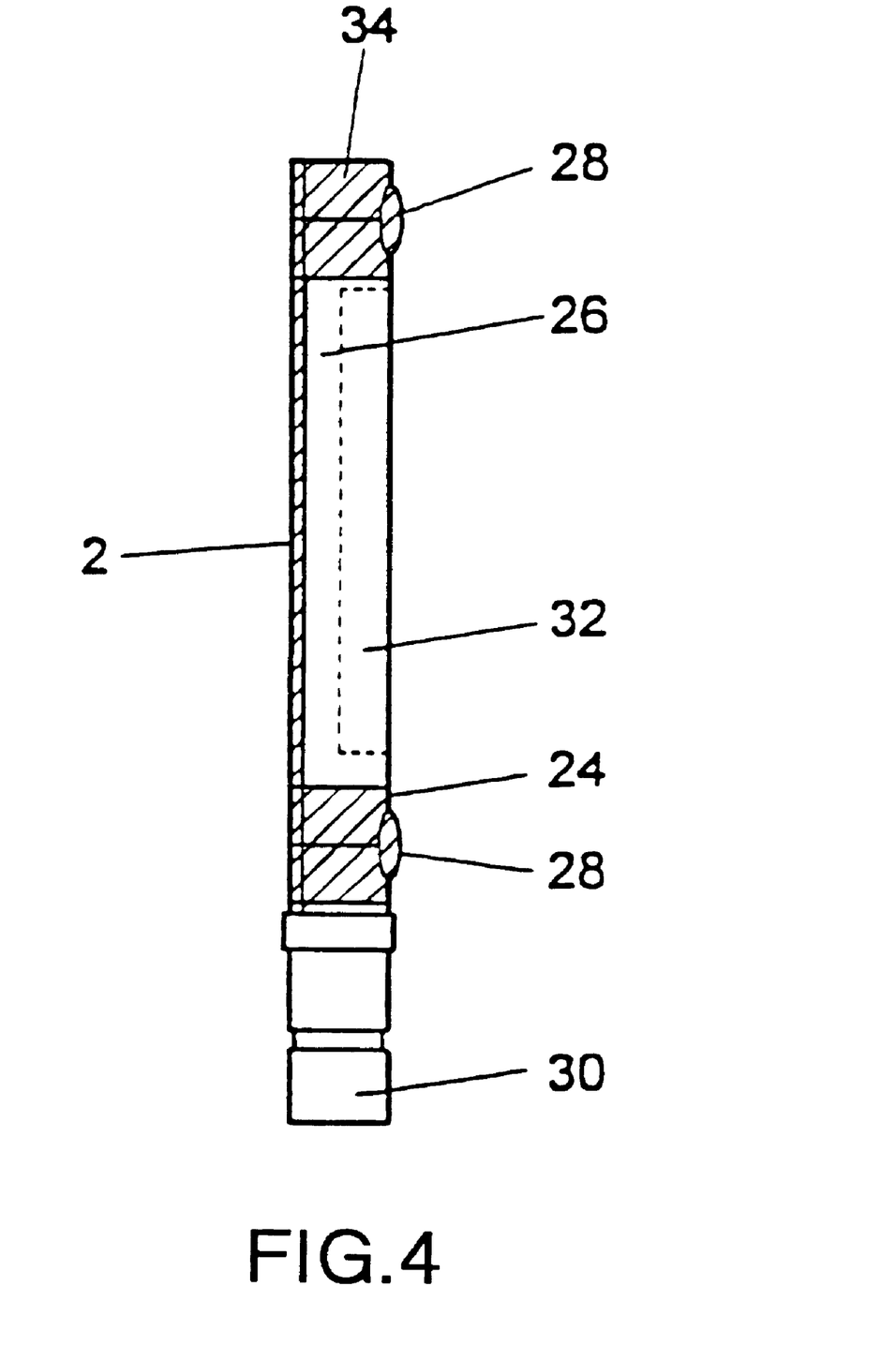
FIG. 4 is a side view of a transducer assembly forming part of the apparatus of FIG. 1.

FIG. 4 shows a side view of any one of the transducer assemblies 2a, 2b, 2c (referred to generally as 2). The transducer assembly 2 is generally cylindrical in shape, comprising a transducer support column 24, to which a piezoelectric membrane 26 is attached to form a hemicylindrical transducer. The transducer support column 24 comprises a tube of electrically conducting material, for example brass, with half of the centre portion removed along part of the longitudinal axis to form a hemicylindrical recess 32 as shown in FIG. 4. The piezoelectric membrane 26 is wrapped around and attached to the transducer support column 24 so as to cover the recess 32. The piezoelectric membrane 26 is made of Polyvinylidene Fluoride (PVdF) film metallised on both sides. The outer, convex side of the membrane 26 is entirely metallised and earthed to the support column 24 through silver-loaded epoxy resin beads 28. The live side of the membrane 26 is surrounded by earthed conductors: the earth electrode of the membrane 26 in front and the conducting support column 24 behind. This provides maximum immunity from external sources of electromagnetic noise. The live side of membrane 26 is only partially metallised in order to avoid contact between the metallised portion and the support column 24. The membrane 26 is attached to the support column 24 with double-sided adhesive tape. The edges of the membrane 26 are covered with adhesive tape 34.

The membrane 26 is connected electrically to a transducer plug 30 via a silver-loaded epoxy resin bead located on the live side of the membrane 26 and a copper foil attached to the transducer plug 30. The transducer plug 30 is attached to the lower end of the support column 24 to form part of the transducer assembly 2. A further electrical connection is made between the transducer plug 30 and a transducer socket 10 (see FIGS. 1 to 3) when the illustrated air flow meter is assembled.

Figure 1:
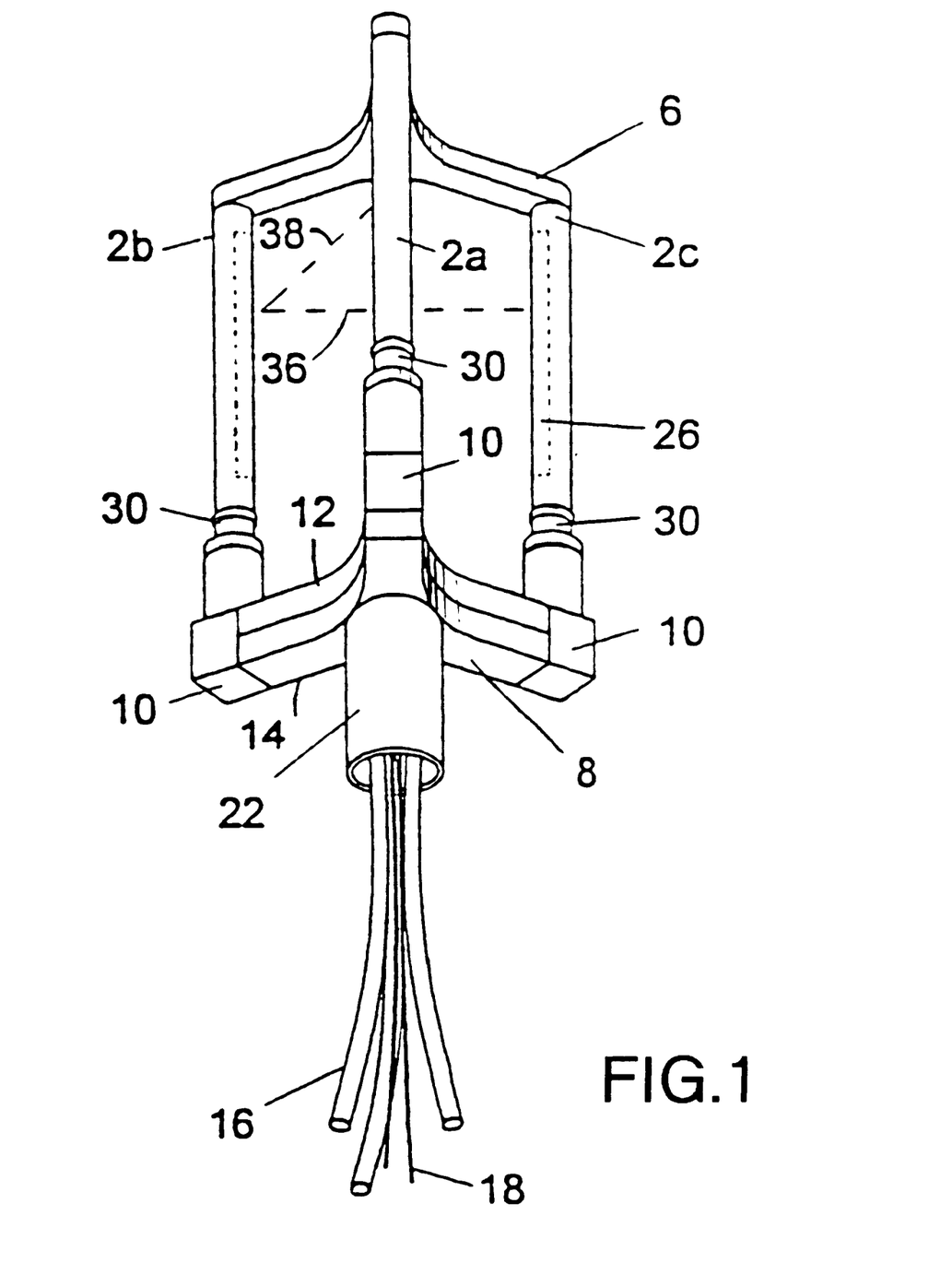
FIG. 1 is a perspective view of a hand held ultrasonic air flow meter according to the invention.
Figure 2:
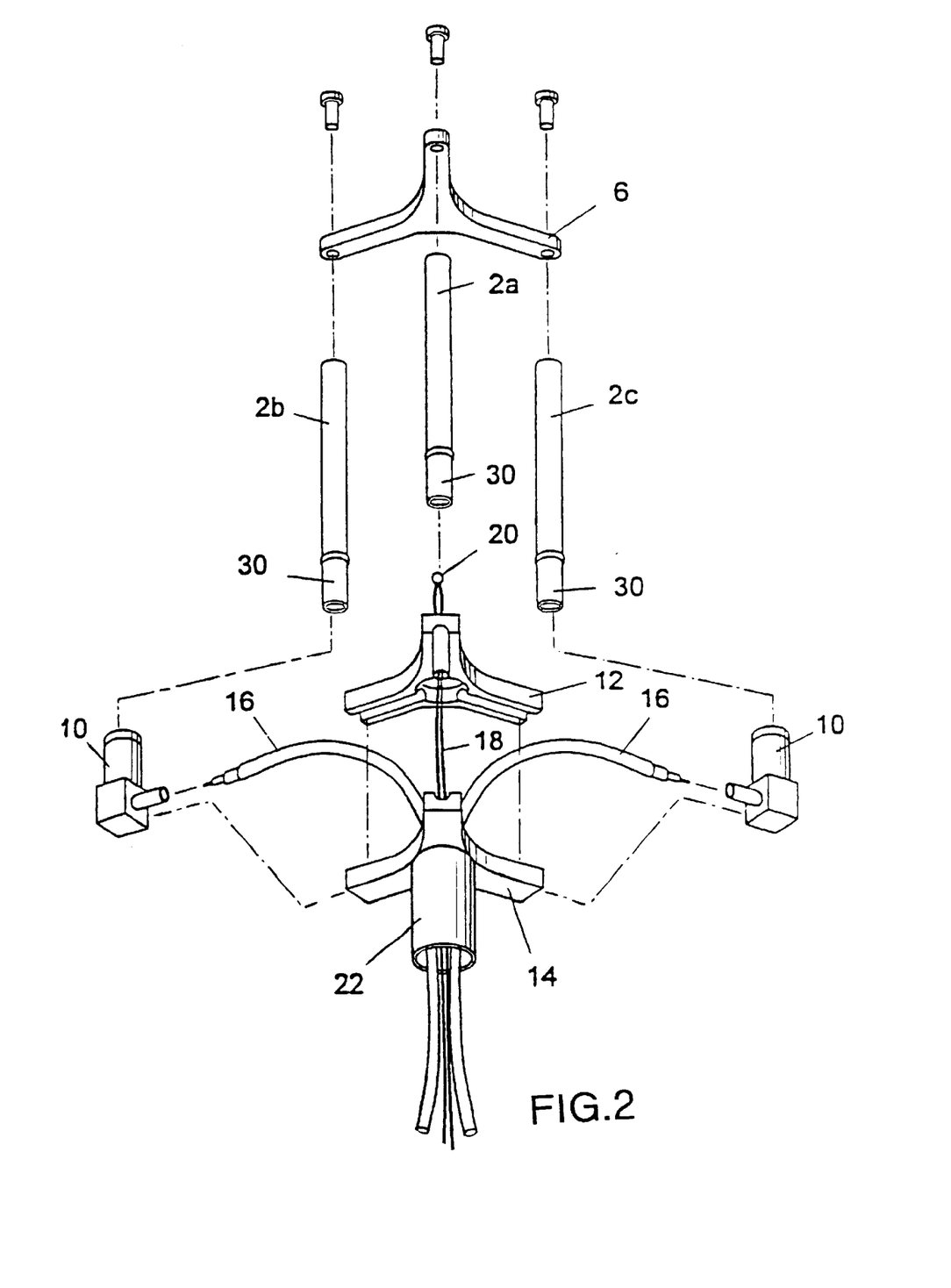
FIG. 2 is an exploded view of the apparatus of FIG. 1.
Figure 3A:
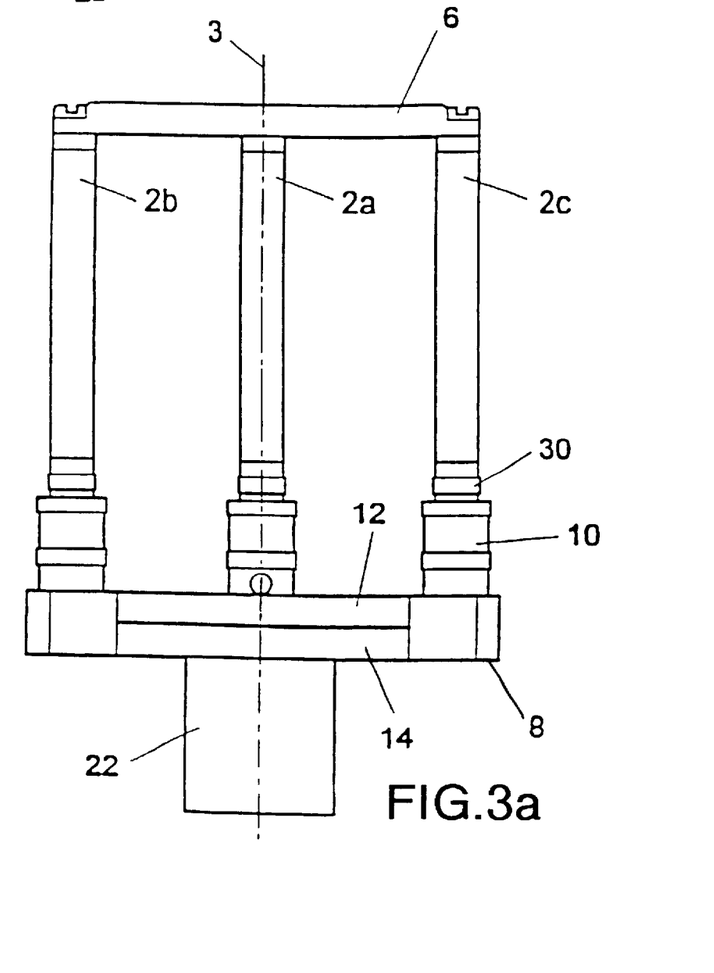
FIG. 3(a) and 3(b) are side and end views respectively of the apparatus of FIG. 1.
Figure 3B:
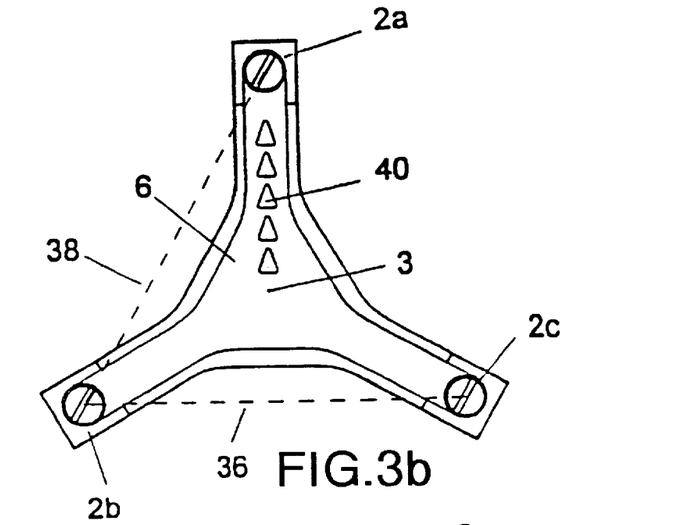

The air flow meter shown in FIGS. 1 to 3 has one transducer assembly 2b orientated such that the piezoelectric membrane 26 faces the longitudinal axis 3. The remaining two assemblies 2a, 2c are orientated towards the centre-facing transducer assembly 2b. The arrangement is such that two signal paths exist; one signal path 36 between the transducer assemblies 2b and 2c, and another signal path 38 between the transducer assemblies 2b and 2a.

The three transducer assemblies 2a, 2b, 2c are retained in position at each end by a three-legged spider plate 6, 8. The upper end of each transducer assembly 2a, 2b, 2c is attached to the upper spider plate 6 using bolts or other appropriate means. The lower end of the transducer assembly 2a, 2b, 2c is attached to the lower spider plate 8 via a transducer a socket 10. The lower spider plate 8 comprises two parts; an upper part 12 and a lower part 14. The two parts 12, 14 of spider plate 8 are separate to assist in the running of electric cables 16,18 during the assembly of the illustrated air flow meter, however this feature is not essential to the operation of the invention. The cables 16 provide the required electric current to each of the three transducer sockets 10. The cables 18 provide the required connection to a thermistor bead 20 located centrally in the upper surface of the lower spider plate 8. The cables 16,18 exit the air flow meter shown in FIGS. 1 to 3 through a hollow cylindrical member 22. The cables 16,18 connect the transducer sockets 10 (and ultimately the transducer assemblies 2a, 2b, 2c) and the thermistor bead 20 to the controlling electronic circuitry.

The illustrated air flow meter is operated by presenting the said device to an air flow, such that the signal path 36 between the transducer assemblies 2b and 2c is approximately perpendicular to the direction of flow and upstream of the transducer assembly 2a. The signal path 38 between the transducer assemblies 2b and 2a then lies at an angle of approximately 30 degrees to the direction of flow. Arrow marks 40 located on the upper spider plate 6 indicate the desired direction of air flow relative to the air flow meter. Determination of the air flow speed is achieved by measuring the effect of the air flow on the propagation time of acoustic pulses transmitted along the signal paths 36 and 38. The transducer assemblies 2a, 2b, 2c transmit acoustic pulses as a consequence of applying electrical signals across the thickness of the piezoelectric membrane 26. In response to the electric signals, the membrane 26 changes length in the circumferential direction. This change in length translates into a relatively high amplitude oscillation or vibration.

The signal path 38 provides the basic air speed measurement. The signal path 36 is used to determine the orientation of the air flow meter relative to its ideal position. The ideal position of the air flow meter has the signal path 36 arranged exactly perpendicular to the direction of the air flow. If the air flow meter is mis-orientated, then the signal path 36 yields a non-zero value which allows a correction factor to be calculated and applied to the measurement derived from the signal path 38.

The data presented to the processing circuitry is in the form of two velocity measurements; one from the signal path 38 and one from the signal path 36. Acoustic pulses are transmitted in bursts back-and-forth along one of the signal paths and the propagation time of each transmission is measured. Acoustic pulses are then transmitted and measured in the same way along the other signal path. Measuring transmissions in both directions along each signal path allows the effects of speed of sound variations with temperature to be ignored.

The velocity measurement taken from the signal path 36 can be the same for a low air flow speed with the signal path 36 at a large angle to the air flow, as for a higher speed and lower angle. The signal path 36 does not, therefore, provide a unique value that directly relates to a unique air flow speed at a unique angle. However, experimentation shows that the ratio of the signal path 36 measurement to the signal path 38 measurement, plotted as a function of the angle to flow, produces a very nearly straight line passing through zero at zero degrees of mis-orientation. This function appears to be similar over the whole air flow speed range. The signal path 38 measurement plotted as a function of the angle to flow also produces closely related lines over the air flow speed range. In this case however, the lines are approximately parabolic with a maximum at approximately 5 degrees of mis-orientation to one side. The two functions may be combined in order to eliminate the need to calculate the angle to the flow. Further experimentation and mathematical analysis yields a number of algorithms which allow the air flow speed to be calculated from the velocity measurements taken from signal paths 36 and 38.

Figure 5:
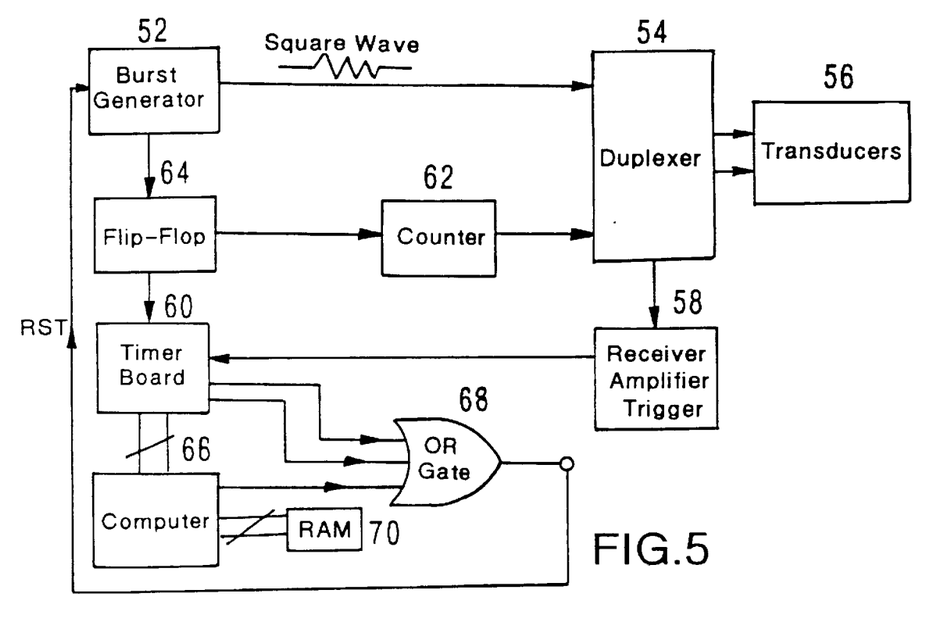
FIG. 5 is a block schematic diagram of the timing arrangement in accordance with the present invention.
Figure 6:
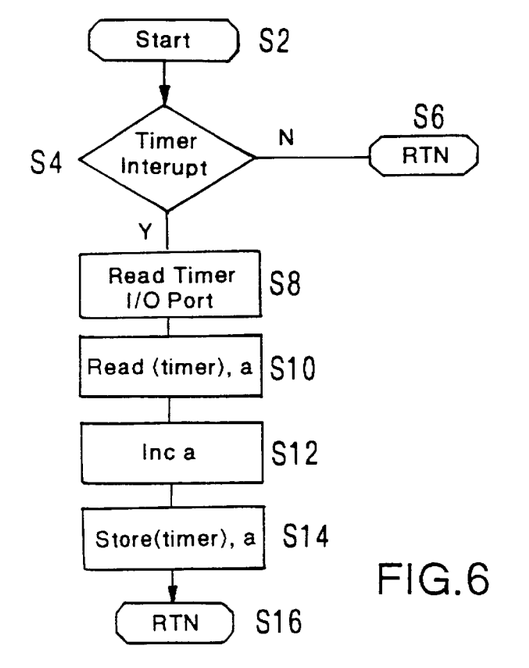
FIG. 6 is a flow chart of an interrupt routine for execution by a microprocessor shown in FIG. 5.
Figure 7:
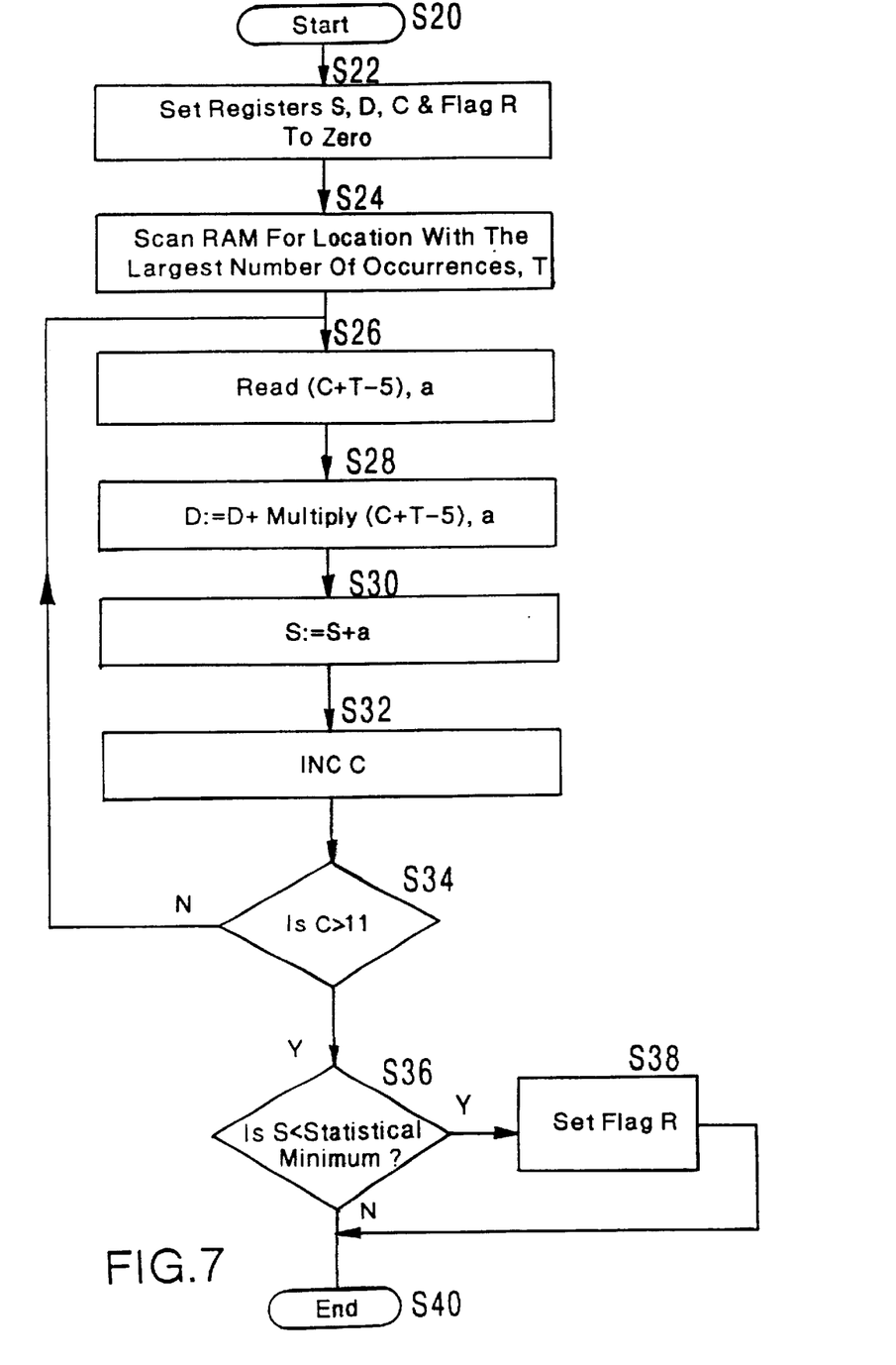
FIG. 7 is a flow chart of a routine for execution by the microprocessor to derive an average value in accordance with the invention.

The timing arrangement according to the invention is described in detail with respect to FIGS. 5 to 7.

FIG. 5 shows a burst generator 52 which provides the oscillation signal for driving the ultrasonic transducers shown in FIGS. 1 to 4. The generator 52 has two outputs, an oscillation signal in which the ultrasonic pulses are separated into bursts and burst trigger output which is effectively a square wave corresponding to the envelope of the oscillating output. The oscillating output is connected to a duplexer 54 which connects the transducers to the burst generator 52 and to a receive amplifier 58 according to whether upstream or downstream measurements are being made. The duplexer 54 has connections 56 to the ultrasonic transducers shown in FIGS. 1 to 4. The burst trigger output is connected to a D-type flip-flop 64 wired as a divide-by-two circuit. An output of the flip-flop 64 is connected to a timer board 60. The board 60 may conveniently comprise a PC plug-in card including the 8254 counter-timer chip. Two timers are provided and are driven to count at 16 megahertz and each comprises 16 bits. The timers are interleaved so that one counter is counting while the other is being read, then re-set, by a computer 66. The computer 66 stores the number of occurrences of each timer interval in a RAM 70, as will be described subsequently.

The burst trigger signal is also fed to a counter 62 having an output connected to the duplexer 54. The purpose of the counter 62 is to alternate the state of the duplexer between upstream and downstream measurements after the completion of a certain number of measurements of each type. In the present arrangement the counter 62 is arranged to time-out so that 1200 bursts from the generator 52 are directed upstream followed by 1200 bursts downstream and so on. After each set of 1200 bursts the samples stored in RAM 70 are analysed.

A return signal from the transducer is amplified and level-sensed by receive amplifier and trigger 58. An output from this trigger is connected to the timer board 60 to provide a stop signal to the timers. Should this signal fail to occur then the counter-timers on the board 60 will time-out at the full count of 65,536. In order to re-set the timing arrangement following such an error the time-out signals from the two timers are connected to an OR gate 68 which also receives an initialise signal from the computer 66. An output from the OR gate 68 comprises a reset signal to the burst generator 52 to start or restart the measurement process. Thus the timing arrangement will be re-initialised if either of the counter-timers reaches its full count.

The operation of the computer 66 will now be described with reference to the flow charts in FIGS. 6 and 7.

FIG. 6 shows an interrupt routine comprising the following steps:

S2 Start
S4 Timer interrupt?
S6 RTN
S8 Read timer I/O port
S10 Read (timer), a
S12 INC a
S14 Store (timer), a
S16 RTN This straightforward routine operates as follows. In response to an interrupt signal from the timer board which indicates that one of the timers is ready to be read an interrupt service routine is entered. At step S4 the routine confirms that the interrupt signal relates to the timers (rather than some other feature of circuit or computer operation). If the timers are not ready to be read the routine ends at step S6.

When the timers are ready to be read, the computer I/O port to which the timer board is connected is read by the routine at step S8. At step S10 the address in the RAM to which the timer output relates is read into a register a. At steps S12 and S14 the value of a is incremented and re-stored at the address (timer) and the routine terminates at step S16. In just three operations, therefore, the "bin" to which the timer output relates is incremented so that an extremely short interrupt routine is provided.

FIG. 7 shows a flow chart showing the steps performed in the averaging routine which are as follows:

S20 Start
S22 Set registers S, D, C and flag R to zero
S24 Scan RAM for location with the largest number of occurrences, T
S26 Read (C+T−5), a
S28 D:=D+multiply (C+T−5), a
S30 S:=S+a
S32 INC C
S34 Is C greater than 11?
S36 Is S less than the statistical minimum?
S38 Set flag R
S40 End The routine starts by scanning the RAM for T, the RAM address corresponding to the most populated bin. The routine proceeds to read the number of occurrences from the bin T and the five bins on either side, multiplying each by its respective address. A count S is maintained of the total number of occurrences in these 11 bins. If S does not reach the minimum statistically satisfactory sample threshold then a flag R is set to indicate that this set of data is suspect. The final value representing the average is stored in register D.

The foregoing description has identified an interrupt routine and an averaging routine to perform the storage of the timing measurements and their averaging respectively. Such an arrangement is suited to concurrent measuring and averaging whereby a RAM or section of RAM is used to store timing measurements while a further section of RAM is being read by the averaging routine. Once the measurement is completed the roles of the sections of RAM reverse and the section of RAM which has just been addressed by the averaging routine is cleared in preparation for a new set of timing measurements.

However, if it is desired to provide less RAM, then the measurement and averaging may be conducted non-concurrently using the same section of RAM. In such an arrangement it may not be necessary for the measurement routine to be an interrupt routine since no averaging will be taking place. It might still be desirable to provide such an interrupt routine, however, to accommodate other processor functions. The RAM must be reset or "cleared down" after the averaging routine has been performed.

While the timing arrangement in accordance with the present invention has been described with reference to a programmed microprocessor and discrete components, the functions of these components could equally well be implemented using a programmable gate array, for example a Field Programmable Gate Array (FPGA). The counter/timer is one of the functions conveniently provided within the FPGA. When the stop counter signal is detected by the counter, it sends its output value to the microprocessor, which then converts this to a pointer by adding an offset value. The location in RAM thereby pointed to is then incremented. The FPGA produces a set number of transmitted bursts for each timing histogram produced. Once a set of pulses has been sent, the FPGA sends an interrupt signal to the processor to initiate the memory routine.

It is preferred that the electroacoustic transducers of the air flow meter shown in FIGS. 1 to 4 are connected electrically to the timing arrangement described with reference to FIGS. 5 to 7. The timing arrangement described above may be used with alternative apparatus where it is necessary for an average value to be derived from a larger number of measurement.

The invention is not limited to the specific embodiment described above. Variations and alterations will be apparent to a reader skilled in the art.

Figure 8A:
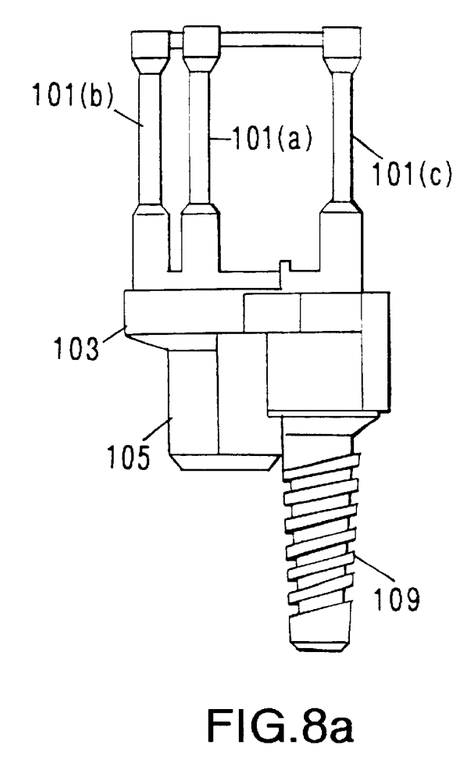
FIG. 8(a) is a perspective view of a different embodiment of this invention showing a hand held ultrasonic flow meter with handle and cable attachment members.
Figure 8B:
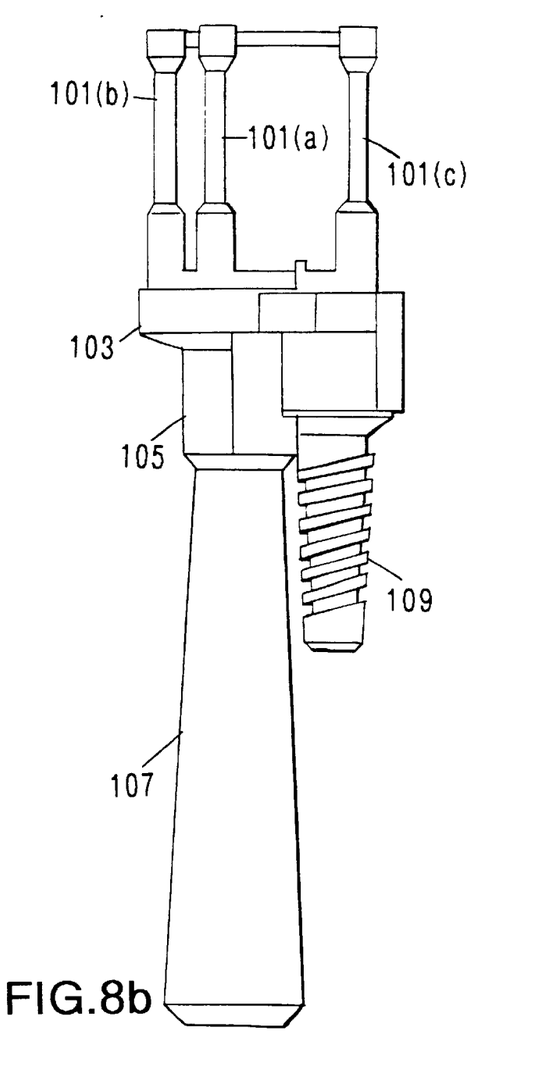
FIG. 8(b) is similar to FIG. 8(a) but further showing a handle attached to the handle attachment member.

Referring now to FIGS. 8(a) and 8(b), the transducer assembly structure is basically similar to the assembly shown in FIG. 1 and comprises the transducer member 101(a), 101(b) and 101(c) which may be equally spaced relative to the longitudinal axis as in FIG. 1, however, they may be spaced unequally relative to the longitudinal axis if desired. The transducer members or probes 101(a), 101(b) and 101(c) are secured to the header 103 having an internally threaded socket member 105 for attachment of an externally threaded handle 107. The header 103 has a cable attachment member 109 attached thereto for transmission of signal to a remote device. As in the embodiment shown in FIGS. 1–4, the assembly shown in FIGS. 8(a) and 8(b) permits two signal paths such as shown in FIG. 3(b).

In use, the embodiment illustrated in FIGS. 8(a) and 8(b) is held by hand in a stream of air and measurements may be carried out in the same way, in conjunction with a timing arrangement, as hereinbefore described in connection with the flow meter of FIGS. 1–4.

For example, in lieu of the piezoelectric membrane, it is possible to use an ultrasonic crystal transmitter. Such crystals are well known in the art. Other variations and alterations may be made which are apparent from the foregoing detailed description of the invention and, therefore, are within the scope of the present invention.

While the air flow measuring device has heretofore been described for measuring air stream velocity, it may be also used for other applications such as in heating, ventilating and air conditioning, face velocity air speed measurements at the face area of grills, diffusers, fume hoods, air turbulence and a host of similar applications.

We claim:

1. An airflow measuring device comprising three vertically disposed transducers arranged at an angle relative to each other, in a horizontal plane , and defining a triangular arrangement, each of said transducers being a generally tubular member having an outer surface, a piezoelectric membrane mounted on said surface, said three vertically disposed transducers being secured between two plate members, an upper plate member and a lower plate member, each of said plate members being generally spider shaped, having three angularly disposed arms, with each of said vertically disposed transducers being securely fixed in position between respective angularly disposed arms of said plate members.

2. An airflow measuring device comprising three vertically disposed transducers arranged at an angle relative to each other, in a horizontal place, and defining a triangular arrangement, each of said transducers being a generally tubular member having an outer surface, a crystal mounted in said surface, said three vertically disposed transducers being secured between two plate members, an upper plate member and a lower plate member, each of said plate members being generally spider shaped, having three angularly disposed arms, with each of said vertically disposed transducers being securely fixed in position between respective angularly disposed arms of said plate members.

* * * * *